(12) United States Patent
Haven et al.

(10) Patent No.: US 9,446,804 B2
(45) Date of Patent: Sep. 20, 2016

(54) DEBRIS GUARD FOR A FINAL DRIVE ASSEMBLY

(71) Applicant: Caterpillar Inc., Peoria, IL (US)

(72) Inventors: Cory C. Haven, Peoria, IL (US); Jason E. Carter, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/483,608

(22) Filed: Sep. 11, 2014

(65) Prior Publication Data

US 2016/0075385 A1 Mar. 17, 2016

(51) Int. Cl.
*B62D 55/08* (2006.01)
*B62D 55/088* (2006.01)
*E02F 9/02* (2006.01)
*B62D 55/125* (2006.01)
*B62D 55/32* (2006.01)

(52) U.S. Cl.
CPC .......... *B62D 55/088* (2013.01); *B62D 55/125* (2013.01); *B62D 55/32* (2013.01); *E02F 9/02* (2013.01)

(58) Field of Classification Search
CPC B62D 55/12; B62D 55/0885; B62D 55/088; B62D 55/0845
See application file for complete search history.

(56) References Cited

U.S. PATENT DOCUMENTS

| | | | |
|---|---|---|---|
| 6,293,631 B1 * | 9/2001 | Freeman | B62D 55/088 301/107 |
| 6,371,578 B1 * | 4/2002 | Ferguson | B62D 55/0887 305/107 |
| 7,946,661 B1 | 5/2011 | Freeman | |
| 8,632,137 B2 * | 1/2014 | Auch | B62D 55/088 305/100 |
| 2011/0148188 A1 | 6/2011 | Larson et al. | |

* cited by examiner

*Primary Examiner* — Kevin Hurley
*Assistant Examiner* — Marlon Arce
(74) *Attorney, Agent, or Firm* — Jeff A. Greene

(57) ABSTRACT

A guard assembly associated with a final drive assembly is provided. The guard assembly includes a skirt member coupled to the final drive assembly such that the skirt member partially encloses the spindle housing. The skirt member includes a first end portion having a mounting surface and a second end portion having an axial projection radially spaced from the outer surface and extending towards the first end portion such that the axial projection defines a circumferential groove adjacent to an outer surface. The guard assembly also includes a segmented seal having an axial member provided in an inner surface and extending inward towards an inner surface and defining a circumferential groove positioned outward from a first diameter such that the circumferential groove is configured to cooperate with and be spaced from the circumferential groove of the second end portion of the skirt member.

17 Claims, 3 Drawing Sheets

DEBRIS GUARD FOR A FINAL DRIVE ASSEMBLY

TECHNICAL FIELD

This invention relates generally to a debris guard and more specifically to a debris guard for the output spindle and final drive of an earthmoving machine.

BACKGROUND

Waste disposal sites provide some of the harshest environments in which machines operate because of the ingestion of material into the intersections between machine components that operate or rotate relative to other parts of the machine. On a waste disposal operation material such as plastic, wire, diapers, cable and other debris can be pulled into the intersection between rotating components of the machines moving and compacting material on the work site. Examples of the interface between rotating components are between the spindle housing and the final drive for a track-type tractor and between the axle and final drive for a waste compactor. When material does become trapped between these interfaces premature wear can occur to components and seals. This component wear can lead to the release of lubricant being retained by seals and may further hasten wear and failure of the final drive components.

To prevent this failure, guards have been installed to protect these rotating intersections. One example of such a guard is disclosed in U.S. Pat. No. 7,946,661 issued to Freeman on May 24, 2011. The guard assembly includes a diametrically split cylindrical shell with a radial groove formed as a stepped labyrinth-like structure. The shell protects a portion of the final drive assembly from external debris, mud etc. The guard also requires disassembly of the final drive so that the individual pieces can be bolted in place either during assembly or retrofitting.

The present disclosure is directed to overcome one or more of the problems as set forth above.

SUMMARY OF THE DISCLOSURE

In one aspect of the present disclosure, a guard assembly associated with a final drive assembly is provided. The guard assembly includes a skirt member coupled to the sprocket hub such that the skirt member partially encloses the spindle housing. The skirt member includes a first end portion having a mounting surface and a second end portion having an axial projection radially spaced from the outer surface and extending towards the first end portion such that the axial projection defines a circumferential groove adjacent to an outer surface. The guard assembly also includes a segmented seal having an axial member provided in an outer surface and extending inward towards an inner surface and defining a circumferential groove positioned outward from a first diameter such that the circumferential groove is configured to cooperate with and be spaced from the circumferential groove of the second end portion of the skirt member.

In another aspect of the present disclosure, a method for assembling a guard assembly associated with a final drive assembly is provided. The method includes fastening a first end portion of a skirt member to the sprocket hub. The skirt member is then positioned over the spindle housing such that the skirt member partially encloses the spindle housing. The final drive assembly is then attached to the spindle. A second end portion of the skirt member is mated with a segmented seal. The inner surface of the segmented seal is positioned over a flange of the spindle housing. Lastly, the segmented seal is fastened to a frame of an earth moving machine.

Other features and aspects of this disclosure will be apparent from the following description and the accompanying drawings.

DETAILED DESCRIPTION

Figure 1:
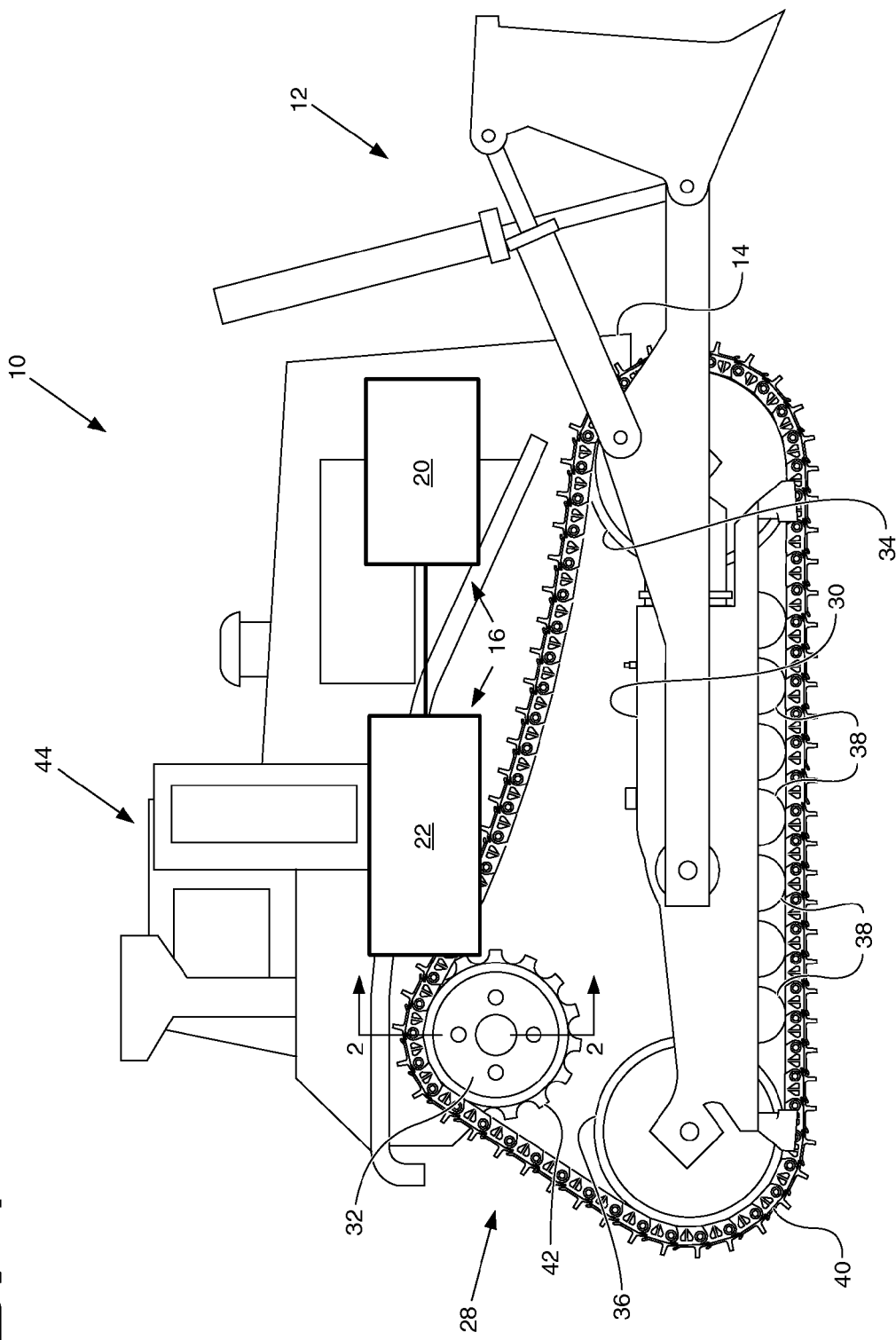
FIG. 1 is a side elevation view of a track-type tractor which incorporates the features of the present disclosure.

Wherever possible, similar reference numbers will be used throughout the drawings to refer to the same or the like parts. Referring to FIG. 1, a machine 10 is shown for example as being a track-type tractor which is utilized to perform numerous functions such as earth moving. The machine 10 includes a number of implements 12 and may also be equipped with a hydraulically-powered ripper (not shown) supported on a main frame 14. A drivetrain 16 is supported on the frame 14 for the production and transmission of motive power. Drivetrain 16 includes a power source such as an internal combustion engine 20 and transmission 22. It should be also understood that drivetrain 16 may include any one or a combination of an internal combustion engine, a gas turbine, a generator, a hybrid engine, an electric motor, or other sources of power known in the art.

The machine 10 is supported and propelled by an undercarriage assembly 28. Undercarriage assembly 28 includes a roller frame 30, a final drive assembly 32, front and rear idler wheels 34, 36, a number of supporting mid rollers 38 and may include one or more carrier rollers (not shown). A traction device 40 such as an endless drive chain or track 40 is entrained by a drive sprocket 42 so as to be advanced around each of the front and rear idler wheels 34, 36 and the mid rollers 38, thereby providing the motive power for advancing the machine 10. In particular, mechanical output from the engine 20 is transmitted to the transmission 22 and the final drive 32, thereby driving the drive sprocket 42 so as to advance the endless drive chain 40 and hence move the machine 10. It should be appreciated that although only one side of the machine 10 is shown in FIG. 1, the other side of the machine 10 would also include an undercarriage assembly 28 having identical components as those shown in FIG. 1.

Machine 10 also includes an operator station or cab 44. The cab 44 is provided to enclose or otherwise house the devices associated with the machine 10 which are utilized by an operator during operation of the machine 10. For example, the cab 44 houses an operator seat (not shown) and a control assembly which includes, for example, a steering inputs, implement controls and foot pedal levers, switches, operator displays, etc.

Figure 2:
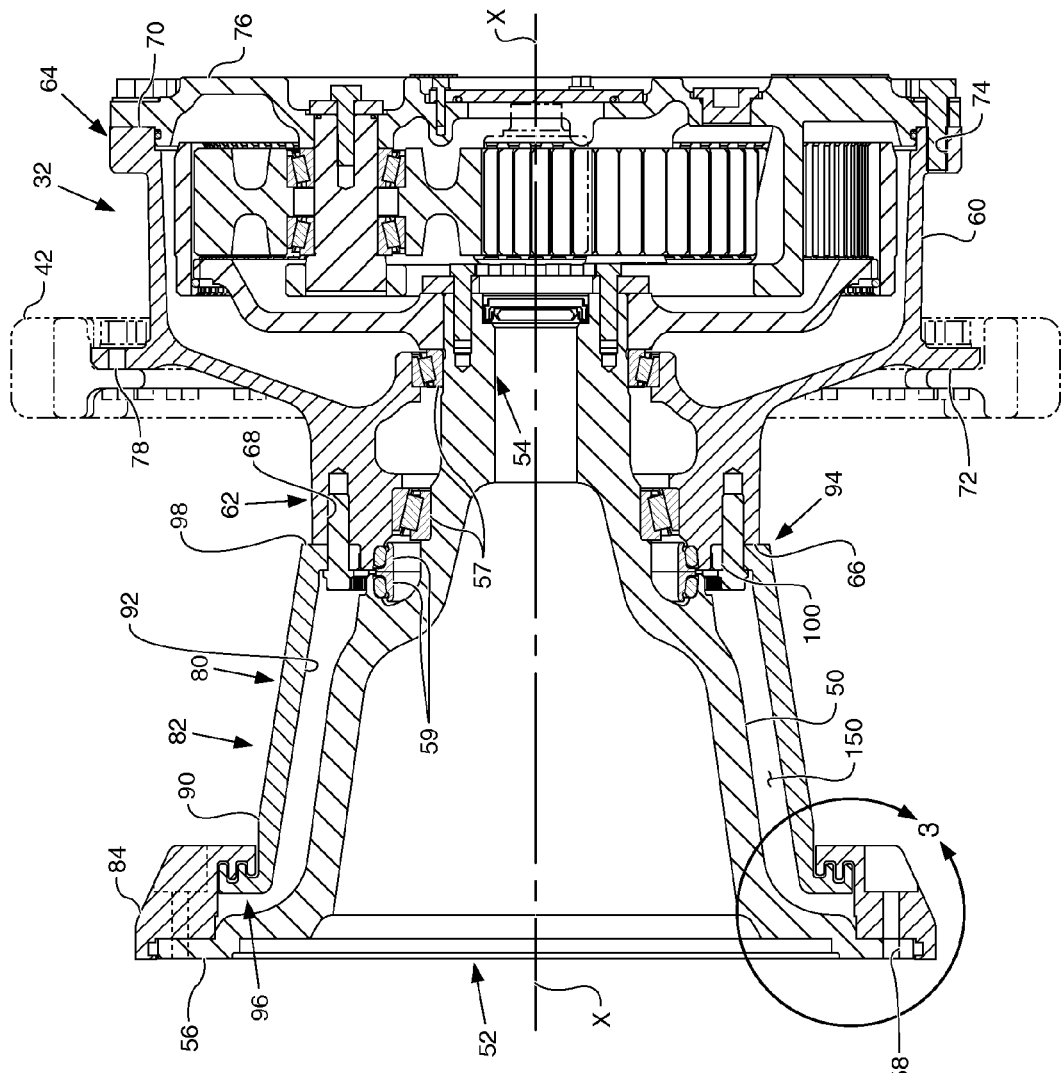
FIG. 2 is a cross-sectional view of a final drive assembly and a guard assembly, with some components removed for clarity, for the machine shown in FIG. 1.

FIG. 2 illustrates a cross-sectional view of the final drive assembly 32, taken along section line 2-2 in FIG. 1. It should be understood that a final drive assembly is positioned on each side of the main frame 14 of the machine 10. The final drive assembly 32 may include a spindle housing 50 and a sprocket hub 60. The spindle housing 50 is cast or forged from material, such as steel, iron, or the like, and is formed in a hollow, generally frustoconical shaped configuration having a first end 52 and a second end 54. The first end 52 has a diameter greater than that of the second end 54. The spindle housing 50 is configured to house a spindle or a shaft (not shown) which passes through the first and second ends 52, 54. An axis X-X of the final drive assembly 32, along which the spindle is positioned, is also shown in the accompanying figures.

Further, a flange 56 radially extends from the first end 52 of the spindle housing 50, in order to enable mounting of the spindle housing 50 to the frame 14 of the machine 10. The flange 56 includes a plurality of apertures 58 that are radially spaced and extend in the direction of axis X-X through the flange 56. The flange 56 is connected to the frame 14 of the machine 10 as by mechanical fasteners, such as bolts, that are positioned through the plurality of apertures 58 and in corresponding threaded holes (not shown) in the frame 14 of the machine 10. A pair of bearings 57 are spaced on and supported by the second end 54 of the spindle housing 50. The bearings 57 provide a rotatable support for mounting of the sprocket hub 60 on the second end 54 of the spindle housing 50. A pair of seals 59 are positioned at the interface of the spindle housing 50 and the sprocket hub 60.

The sprocket hub 60 is made from cast material, such as iron, etc., and forms a hollow cylindrical shaped configuration having a first portion 62 and a second portion 64. The first portion 62 of the sprocket hub 60 has a diameter generally smaller than that of the second portion 64. The first portion 62 has a radial face 66 that includes a plurality of radially spaced threaded apertures 68 positioned therein, that are used to attach a guard assembly 80 as will be further described below. The sprocket hub 60 is rotatably supported on the second end 54 of the spindle housing 50 by supporting the first portion 62 on the pair of bearings 57 as described earlier. The second portion 64 of the final drive housing 50 includes first and second spaced apart flanges 70, 72. The first flange 70 includes a plurality of radially spaced threaded apertures 74 for mounting a cover 76 thereto as by fasteners. The second flange is also the sprocket flange 72 includes a plurality of radially spaced through apertures 78 for mounting the sprocket 42. The sprocket 42 is made up of multiple sprocket segments that are mounted to the sprocket flange 72 as by fasteners. It is also worth mentioning that the first flange 70 may have other types of traction devices 40 such as rims and tires for a wheel loader or compacting wheels for a land fill compactor as well.

Figure 3:
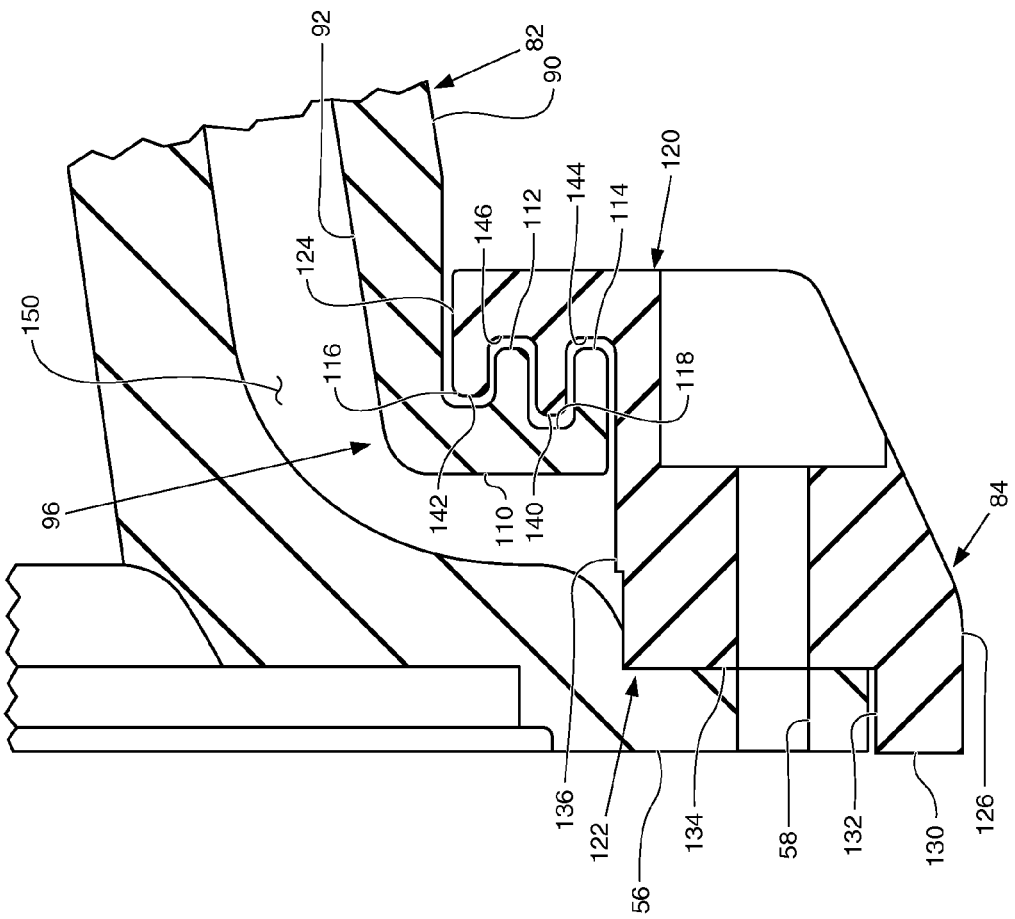
FIG. 3 is a perspective view of a skirt member.

Still referring to FIG. 2, the guard assembly 80 is positioned about the spindle housing 50 and the interface between the spindle housing 50 and the sprocket hub 60 to cover and protect the same from the ingestion of dirt and debris. The guard assembly 80 includes a skirt member 82 and a segmented flange 84. As shown in FIG. 2, the skirt member 82 may be configured to partially enclose the spindle housing 50. Referring to FIGS. 2 and 3, the skirt member 82 is a single hollow member having a frustoconical shape. Skirt member 82 has an outer surface 90 and an inner surface 92. Skirt member 82 further includes a first end portion 94 and a second end portion 96.

The first end portion 94 may have a diameter smaller than that of the second end portion 96. First end portion 94 has a radial mounting face 98, having a plurality of radially spaced through apertures 100 that are alignable with the plurality of radially spaced threaded apertures 68 in the first portion 62 of the sprocket hub 60. The skirt member 82 is releasably fastened to the sprocket hub 60 by fasteners in a known manner. Accordingly, during operation as the sprocket hub 60 and the sprocket 42 rotate, the skirt member 82 also rotates therewith about the axis X-X.

The second end portion 96 of the skirt member 82 also includes an extension ring 110 projecting radially outwards. The extension ring 110 may be integrally formed on an edge of the second end portion 96. The extension ring 110 may be provided with an axial projection 112, hereinafter referred to as the first axial projection 112. As shown in the FIGS. 2 and 3, a second axial projection 114 may also be provided. As shown, the first and second axial projections 112, 114 are radially spaced apart and extend in the direction of axis X-X towards the first end portion 94 of the skirt member 82.

A circumferential groove 116 is defined between the axial projection 112 and the outer surface 90 of the skirt member 82. A second circumferential groove 118 is formed between the first and second axial projections 112,114. The length of the axial projections 112, 114 and width of the grooves are of predetermined dimensions based on given design requirements for various size machines. Further, the length and given dimensions of the skirt member 82 vary based on a specific machine as well.

For example, an axial length of the skirt member 82 may be predetermined based on a gauge setting associated with the machine 10. Likewise the diameter of the first and second end portions 94, 96 of the skirt member may be larger or smaller based on the size of the machine 10. The gauge setting of the machine 100 is defined as the distance between track members 40. Therefore a wider gauge setting would require the length between the flange 56 of the spindle housing 50 and the sprocket 42 to be longer, thus requiring a longer skirt member 82.

The guard assembly 80 also includes the segmented seal 84. The segmented seal 84 may include at least two members, each having a semi-circular configuration. Referring to FIG. 2, the segmented seal 84 may be detachably coupled to the frame 14 of the machine 10. As is shown, segmented seal 84 is coupled to the frame 14 via fasteners that extend through apertures 58 positioned in the flange 56 of the spindle housing 50. However, the segmented seal 84 could be mounted directly to the machine frame 14 as well. The segmented seal 84 may be alternatively be configured to be securely fastened to radial face 66 of the sprocket hub 60. The mating of the segmented seal 84 with the flange 56 of the spindle housing 50 and the skirt member 82 will now be described in detail.

As shown in FIGS. 2 and 3, the segmented seal 84 may include outer and inner surfaces 120, 122 and inner and outer diameters 124, 126. The inner surface 122 of the segmented seal 84 is configured to engage the flange 56 of the spindle housing 50 and operatively cooperate with the extension ring 110 of the skirt member 80. The inner surface 122 of the segmented seal 84 has a multi-stepped configuration extending from the outer diameter 126 to the inner diameter 124. The steps include a first radial surface 130 extending inward from the outer diameter 126. First radial surface 130 joins inner diameter surface 132 that is larger than an outer diameter of flange 56 so as to be positioned over it. Inner diameter 132 mates with a second radial surface 134 that may be configured to mate with the flange 56 of the spindle housing 50. It should be understood as stated before the stepped configuration of first radial surface 130, inner diameter surface 132 and second radial surface could be a single radial surface that may be mounted directly to the machine frame 14. Second radial surface 134 joins a second inner diameter 136 that is operatively associated with the radial extension 110 of the skirt member 82.

Extending inward and spaced from the second inner diameter 136 is an extension ring 138. As shown in the FIGS. 2 and 3, the extension ring 140 may be integrally formed in the segmented seal 84. The extension ring 140 may be provided with an axial member 140, hereinafter referred to as the first axial member 140. As shown in the FIGS. 2 and 3, a second axial member 142 may also be provided. As shown, the first and second axial members 140,142 are radially spaced apart and extend in the direction of axis X-X towards the first radial surface 130 of the segmented seal 84.

A circumferential groove 144 is defined between the axial member 140 and second inner diameter 136 of the segmented seal 84. A second circumferential groove 146 is formed between the first and second axial members 140,142. The length of the axial members 140,142 and width of the grooves 144,146 are of predetermined dimensions. Further, the diameter and dimensions of the segmented seal 84 based on a specific machine as well. More importantly, the first and second axial members 140,142 of the segmented seal 84 may be provided to cooperate with and be spaced apart from the first and second axial projections 112,114 of the skirt member 82. It should be noted that additional axial members may be provided on the segmented seal 84 based on the corresponding number of axial projections provided on the skirt member 82.

Specifically, as shown in FIG. 2, on assembly of the segmented seal 84 on the spindle housing 50, the first and second axial members 140,142 of the segmented seal 84 may mate within the first and second circumferential grooves 112, 114 provided on the second end portion 96 of the skirt member 82, while the first and second axially extending projections 112, 114 of the skirt member 82 may mate within the first and second circumferential grooves 144,146 of the segmented seal 84. Hence, a sealing labyrinth may be formed on assembly of the segmented seal 84 on the skirt member 82.

The specific arrangement and axial orientation of the sealing labyrinth may prevent debris or other unwanted material from contacting the spindle housing 50 and the sprocket hub 60. A person of ordinary skill in the art will appreciate that the mating of the segmented seal 84 with the skirt member 82 may include tolerance air gaps formed within the sealing labyrinth in order to allow for the rotation of the skirt member 82 with respect to the segmented seal 84 with minimal frictional forces. Moreover, after assembly of the skirt member 82, an air gap 150 may be formed between the spindle housing 50 and the inner surface 92 of the skirt member 82. The air gap 150 may prevent rubbing of the inner surface 92 of the skirt member 82 on the spindle housing 50 when the skirt member 82 rotates along with the sprocket hub 60 about the axis X-X.

INDUSTRIAL APPLICABILITY

During routine operation of the machine 10, the final drive assembly 32 associated with it may come in contact with unwanted debris such as dirt or dust and the like. This material may enter the seals and/or bearing components between the sprocket hub 60 and the spindle housing 50. Typically, in waste handling applications, wrapping debris like wire, plastic bags and diapers may wrap around the final drive assembly 32 and may tend to limit the rotary motion of a sprocket 42 of the final drive assembly 32. Additionally, this material tightens and forces material into the pair of seals 59 at the interface of the spindle housing 50 and the sprocket hub 60. This may lead to excessive wear of components of the final drive assembly 32, reduced efficiency due to machine downtime and frequent maintenance schedules.

The present disclosure provides a guard assembly 80 for the final drive assembly 32. The guard assembly 80 includes the skirt member 82 configured to partially enclose the spindle housing 50. The skirt member 50 is frustoconical in shaped which enables the wrapped debris and/or other unwanted material accumulated on the skirt member 50 to collect towards the first end portion 94 of the skirt member 82 proximate to the sprocket flange 72, rather than move radially outward and axially inwards towards the second end portion 96 of the skirt member 82. Hence, the shape of the skirt member 82 enables the debris to be pushed away from the interface between the segmented seal 84 and the second end portion 96 of the skirt member 82, thereby protecting the interface between the spindle housing 50 and the sprocket hub 60.

Further, the specific axial orientation of the sealing labyrinth provided on the second end portion 96 may further prevent the unwanted material from entering into the spindle housing 50 or the sprocket hub 60. Additionally, the axial length of the skirt member 82 may be modified to accommodate the different gauge settings of the machine 10. Accordingly, the disclosed guard assembly 80 may be utilized on a variety of machines 10, with minimal modifications to the overall final drive assembly components.

A method of assembling the guard assembly 80 to a machine 10 is now described. The first end portion 94 of the skirt member 82 is fastened to the first end portion 62 of the sprocket hub 60. The skirt member 82 is fastened to the final drive housing 60 by bolts or screws in the plurality of axial holes 68, 100 in the final drive housing 60 and skirt member 82, respectively. The skirt member 82 is positioned over the spindle housing 50 in such a manner that the skirt member 82 may partially enclose the spindle housing 50 as shown in FIG. 2. The final drive assembly 32 is then attached to the spindle (not shown). The second end portion 96 of the skirt member 82 is mated within the segmented seal 84 such that the axial projection 112 of the skirt member 82 mate within the circumferential groove 146 of the segmented seal 84. Also, the axial member 140 of the segmented seal 84 mate within the circumferential groove 118 of the skirt member 82 forming the sealing labyrinth. The inner surface 122 of the segmented seal 84 is positioned over the spindle housing 202 and fastened to the frame 102 of the machine 10 by providing bolts or screws. After coupling the segmented seal 84 to the frame 14 of the machine 10, a sprocket 42 or a traction device 40 can be attached to the final drive assembly 32.

What is claimed is:

1. A guard assembly for a machine having a frame and a final drive assembly positioned on each side of the frame, the final drive assembly having a spindle housing with a flange connected to the frame and a sprocket hub rotatably supported on the spindle housing, the guard assembly comprising:

a skirt member having inner and outer surfaces and first and second end portions, the skirt member partially enclosing the spindle housing, the second end portion of the skirt member having an axial projection radially spaced from the outer surface and extending towards the first end portion, the axial projection defining a first circumferential groove adjacent the outer surface; and a segmented seal having inner and outer surfaces, the inner surface including an axial member extending axially along the inner surface and defining a second circumferential groove, the axial member and the second circumferential groove on the segmented seal configured to cooperate with and be spaced from the axial projection and the first circumferential groove of the skirt member.

2. The guard assembly of claim 1, wherein the first end portion of the skirt member is fastened to and rotatable with the sprocket hub.

3. The guard assembly of claim 1, wherein the outer surface of the skirt member is frustoconical in shape.

4. The guard assembly of claim 3, wherein first end portion of the skirt member is smaller in diameter than the second end portion.

5. The guard assembly of claim 1, wherein an axial length of the skirt member has a predetermined length, wherein the predetermined length is based on a gauge setting associated with the earth moving machine.

6. The guard assembly of claim 1, wherein the inner surface of the segmented seal includes a stepped portion configured to be positioned over the flange of the spindle housing.

7. The guard assembly of claim 1, wherein the segmented seal and the flange of the spindle housing are secured to the frame by a plurality of mechanical fasteners received into a plurality of circumferentially spaced apertures in the segmented seal with corresponding axial holes provided on the flange.

8. The guard assembly of claim 1, wherein the segmented seal includes at least two segments, each of the two segments having a semi-circular configuration.

9. The guard assembly of claim 1, wherein the second end portion of the skirt member includes a second axial projection being radially spaced outward from the first axial projection and defining a third circumferential groove.

10. The guard assembly of claim 9, wherein the segmented seal includes a second axial member being radially spaced inward from the first axial member and defining a second axial groove, the first and second axial projections of the skirt member are configured to cooperate with the first and second axial members of the segmented seal forming a sealing labyrinth, the sealing labyrinth configured to prevent material from contacting the spindle housing.

11. An earth moving machine comprising:
a power source;
a frame;
a final drive assembly positioned on each side of the frame, the final drive assembly having a spindle housing with a flange connected to the frame and a sprocket hub rotatably supported on the spindle housing;
a guard assembly for the final drive assembly, the guard assembly including:
a skirt member coupled to the sprocket hub, the skirt member configured to partially enclose the spindle housing, the skirt member including:
an outer surface;
an inner surface;
a first end portion having a mounting surface; and
a second end portion having an axial projection radially spaced from the outer surface and extending towards the first end portion, the axial projection defining a first circumferential groove adjacent the outer surface; and
a segmented seal including:
an outer surface having a first diameter;
an inner surface having a second diameter; and
an axial member provided in the inner surface and extending inward towards the inner surface and defining a second circumferential groove positioned outward from the first diameter, the second circumferential groove configured to cooperate with and be spaced from the first circumferential groove of the second end portion of the skirt member.

12. The earth moving machine of claim 11, wherein the first end portion of the skirt member is connected to and rotatable with the sprocket hub.

13. The earth moving machine of claim 11, wherein the outer surface of the skirt member is conical in shape.

14. The earth moving machine of claim 13, wherein first end portion of the skirt member is smaller in diameter than the second end portion.

15. The earth moving machine of claim 11, wherein an axial length of the skirt member has a predetermined length, wherein the predetermined length is based on a gauge setting associated with the earth moving machine.

16. The earth moving machine of claim 11, wherein the second end portion of the skirt member includes a second axial projection being radially spaced inward from the first axial projection and defining a third circumferential groove.

17. The earth moving machine of claim 16, wherein the segmented seal includes a second axial member being radially spaced inward from the first axial member and defining a second axial groove, the first and second axial projections of the skirt member are configured to cooperate with the first and second axial members of the segmented seal forming a sealing labyrinth, the sealing labyrinth configured to prevent material from contacting the spindle housing.

* * * * *